Dec. 7, 1937.  W. P. BULLARD ET AL  2,101,775
BRANDING MACHINE
Filed Dec. 22, 1936  6 Sheets-Sheet 1

Inventors
William P. Bullard
and Oswell L. Williams
By Richard K. Stevens
Attorney

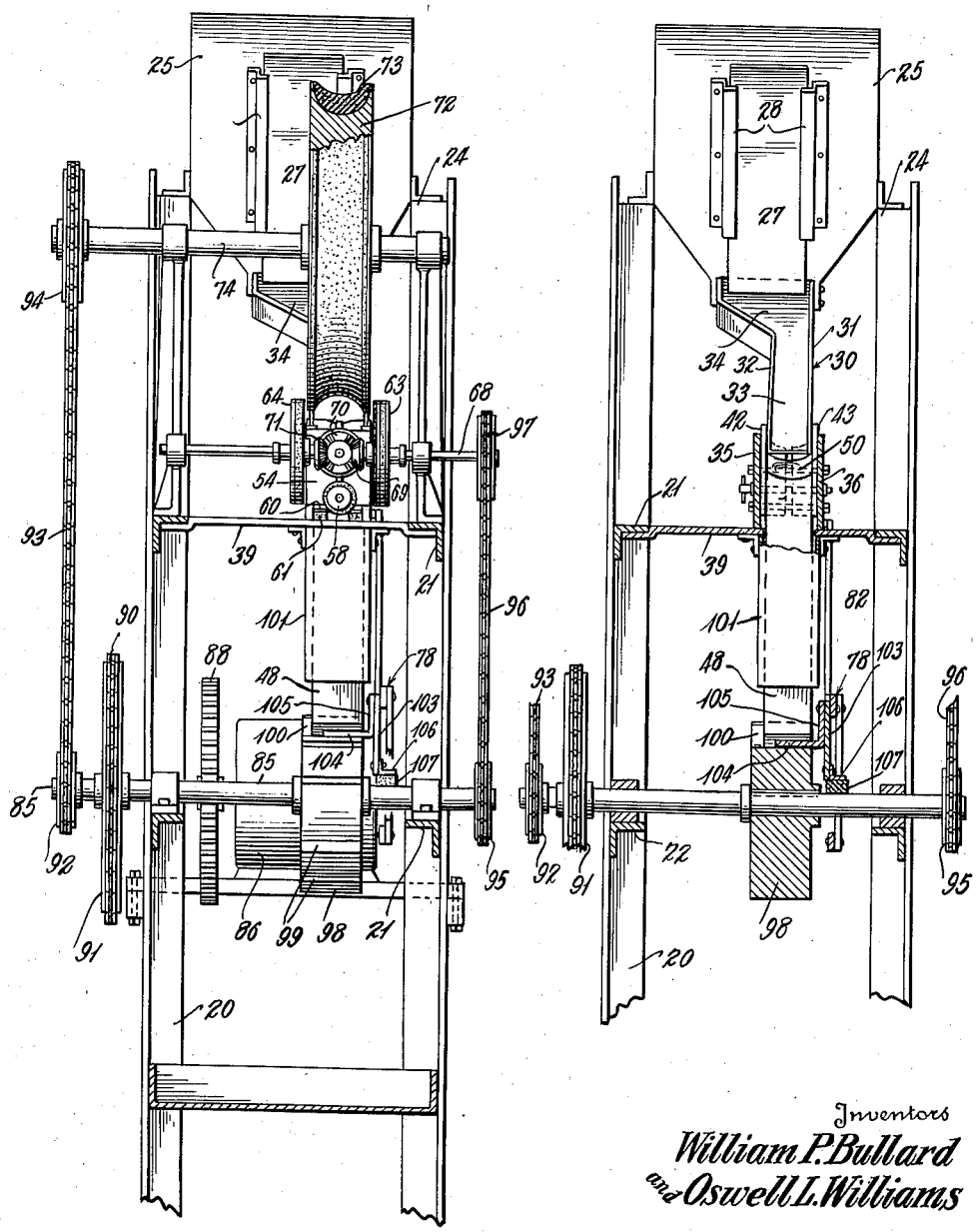

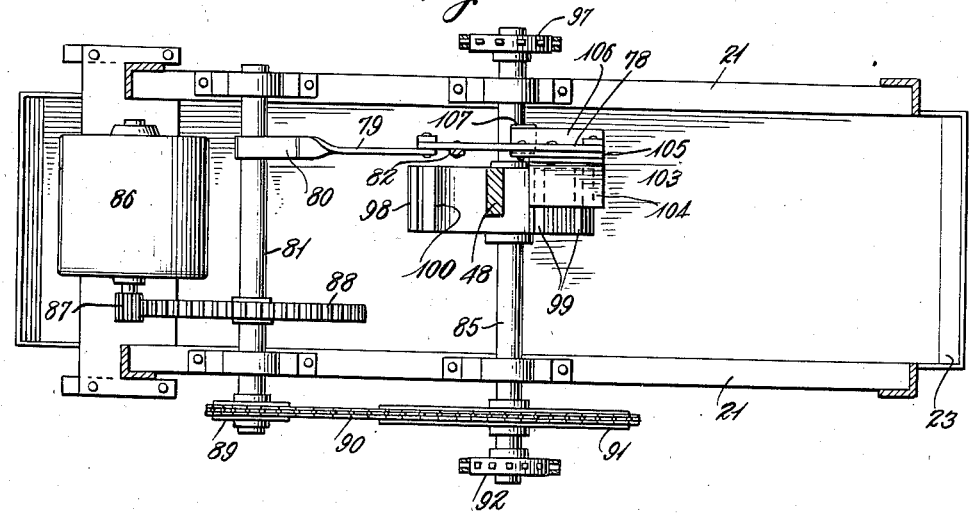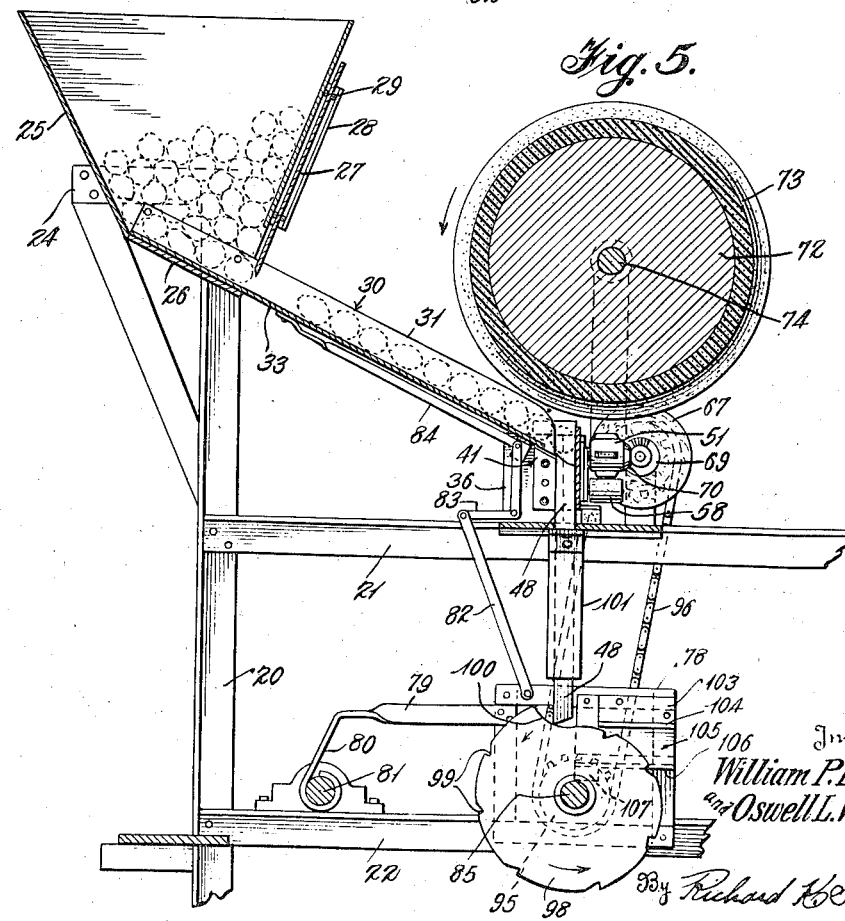

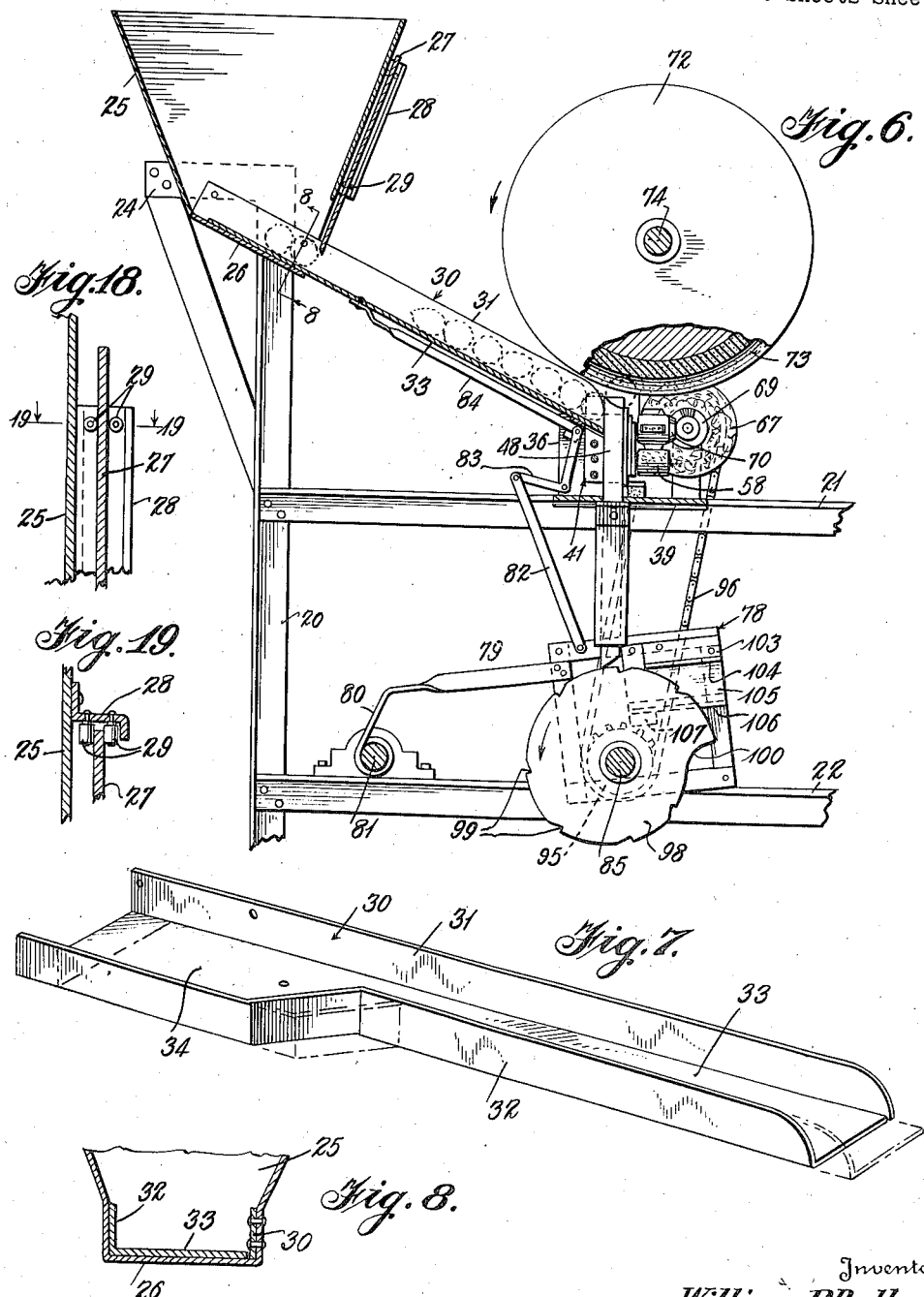

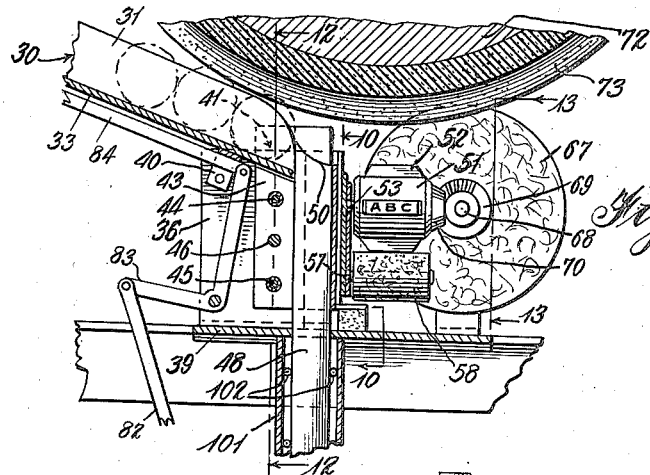
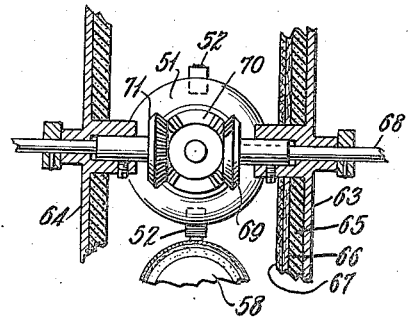
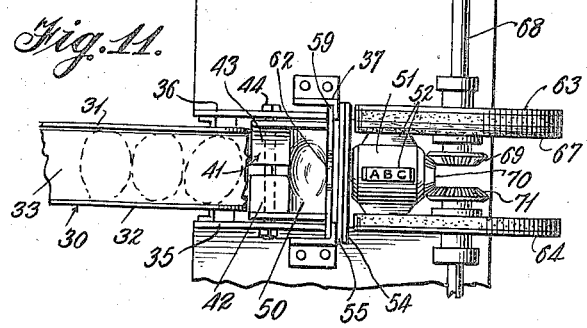
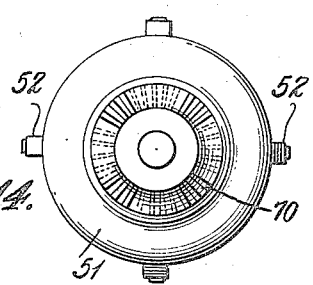
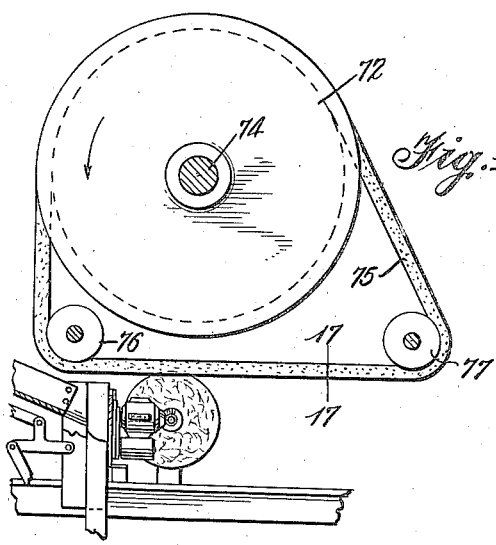

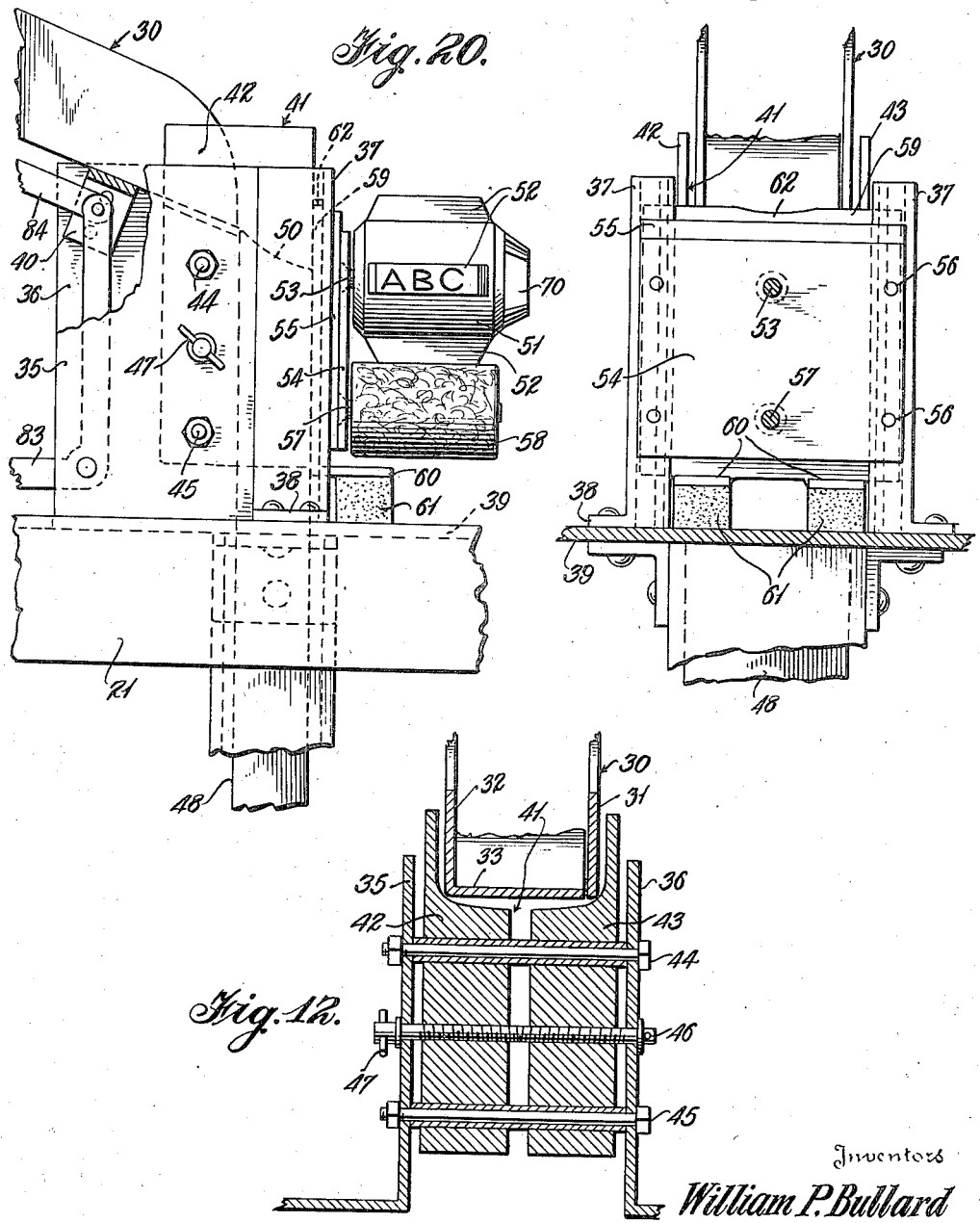

Patented Dec. 7, 1937

2,101,775

UNITED STATES PATENT OFFICE 2,101,775

BRANDING MACHINE

William P. Bullard and Oswell L. Williams, Albany, Ga., assignors to National Pecan Growers Exchange, Albany, Ga., a corporation of Georgia Application December 22, 1936, Serial No. 117,232

20 Claims. (Cl. 101—40)

This invention relates to certain improvements in printing or branding machines and more particularly to a novel arrangement of synchronized instrumentalities for automatically feeding in predetermined order and timed relation, commodities such as nuts, fruit and the like, to a continuously operated and improved form of marking or printing device.

Machines and devices for marking or branding nuts, fruit and like produce, are well known in the art and the obvious advantages to the seller and the purchaser of so identifying or distinguishing a desirable commodity, particularly foods, from the ordinary run of such goods, is apparent.

During recent years branded English walnuts, oranges and the like have been marketed in large quantities to a great advantage to both the distributor and the buying public, but the present machines for performing this branding operation have not proved entirely satisfactory from the standpoint of quantity production and efficiency. In many instances in an effort to speed up production, the articles have been bruised or crushed and the markings blurred and indistinguishable and the better known branding machines are limited in their adaptability to certain specific commodities and not capable of general use without radical alterations or changes.

The invention as represented in the instant machine contemplates an improved construction and arrangement having as its object the provision of a branding machine for nuts, fruit and the like whereby the desired operations can be accomplished in a continuous, uninterrupted and efficient manner.

The present form of the invention is illustrated and described in connection particularly with the branding of pecan nuts and comprises generally stated, a hopper for receiving the nuts in bulk, from which they are delivered by a chute or the like to a printing or stamping mechanism. The ideal way for nuts to pass out of the hopper is in a single layer along the bottom of a conveyor chute and if more than that number attempt to crowd through, the uppermost nut or nuts cause a pressure on the nuts below resulting in a crushing or breaking of said nuts due to an arching or jamming at the discharge gate.

A further object of the invention is to provide a novel automatically operated gate that will permit the feeding of the nuts therethrough without causing this arching or jamming at this delivery point, said gate cooperating with a specially constructed and designed chute to be hereinafter more fully described.

Another object of the invention is the provision of a novel means at the discharge end of the chute for aligning the nuts in proper position to be stamped or printed by the printing mechanism.

A further object of the invention is to provide an improved means for diverting the nuts from the aligning means to a position to be engaged by a feeding means for delivering the nuts in single relation to the printing mechanism, said feeding means adapted to grip the nuts and carry them forwardly without crushing or injuring said nuts.

A still further object of the invention is the provision of an agitating mechanism for the chute and elevator whereby the nuts will be fed from the hopper without arching or jamming and also properly aligned before being presented to the marking or printing mechanism.

The invention further contemplates an improved form of printing mechanism together with a novel means cooperating therewith for cleaning and inking the printing dies whereby smearing or blurring is positively prevented.

Generally stated, the present machine comprises a framework supporting in elevated position a hopper for receiving the nuts in bulk, from which they are discharged by agitation and gravity into a downwardly inclined conveyor chute, the upper end of the chute extending into the hopper at the bottom thereof through an opening controlled by an automatically operated, vertically slidable, gate. The lower end of the chute is slidably supported in a box-like housing, and also mounted within this housing adjacent the lower end of the chute is an adjustable throat for receiving the nuts individually from the chute. Vertically slidable within this throat is an elevating member or bar having its upper end formed with a concaved bevel approximating the rounded outer surface of a nut. This elevator is intermittently raised with a slight jarring action whereby the nut is properly positioned in the adjustable throat in a manner to be hereinafter described. Mounted above this mechanism is a continuously rotated feed roller which engages the nut when it reaches its final elevated position. This housing previously referred to, enclosing the lower end of the chute, and the adjustable throat and elevator, also supports for rotation, an intermittently operated marking or printing die and when the nut is engaged by the feed roller it is moved off of the elevator into and across the printing die to complete the operation. Mounted below the above referred to devices are the novel power driven instrumentalities for performing the various stated functions in the manner to be described in detail in the following specification.

The preferred embodiment of the invention is illustrated in the accompanying drawings in which:

Figure 2 is a view partly in section and partly in elevation on the line 2—2 of Figure 1;

Figure 3 is a like view on the line 3—3 of Figure 1;

Figure 4 is a view partly in plan and partly in section on the line 4—4 of Figure 1;

Figure 5 is a vertical longitudinal sectional view partly in elevation of the machine as illustrated in Figure 1;

Figure 6 is a view similar to Figure 5, showing a different step in the operation of the machine;

Figure 7 is an enlarged perspective view of the conveyor chute;

Figure 8 is an enlarged transverse sectional view of the chute on the line 8—8 of Figure 6;

Figure 9 is an enlarged detail view of the printing mechanism and the mechanism for positioning the nuts and delivering them to the printing mechanism;

Figure 10 is an enlarged detail view on the line 10—10 of Figure 9 with the printing mechanism removed;

Figure 11 is an enlarged detail plan view of the printing mechanism and adjacent end of the feed chute with the feed roller removed;

Figure 12 is an enlarged sectional view on the line 12—12 of Figure 9 of the adjustable throat at the lower end of the chute;

Figure 13 is an enlarged sectional view on the line 13—13 of Figure 9, illustrating more clearly the cleaning and inking mechanism for the printing die;

Figure 14 is an enlarged outer end view of the printing die;

Figure 15 is an enlarged detail view showing the segmented bevel gear for driving the die holder;

Figure 16 is a side elevation view of a modified feeding means for conveying the nuts to the printing mechanism;

Figure 17 is an enlarged sectional view on the line 17—17 of Figure 16;

Figure 18 is an enlarged partial sectional view of the hopper gate illustrated in Figure 6;

Figure 19 is a partial transverse sectional view on line 19—19 of Figure 18; and Figure 20 is an enlarged side elevational view of the cooperating units intermediate the lower end of the feed chute and printing mechanism.

Figure 1:
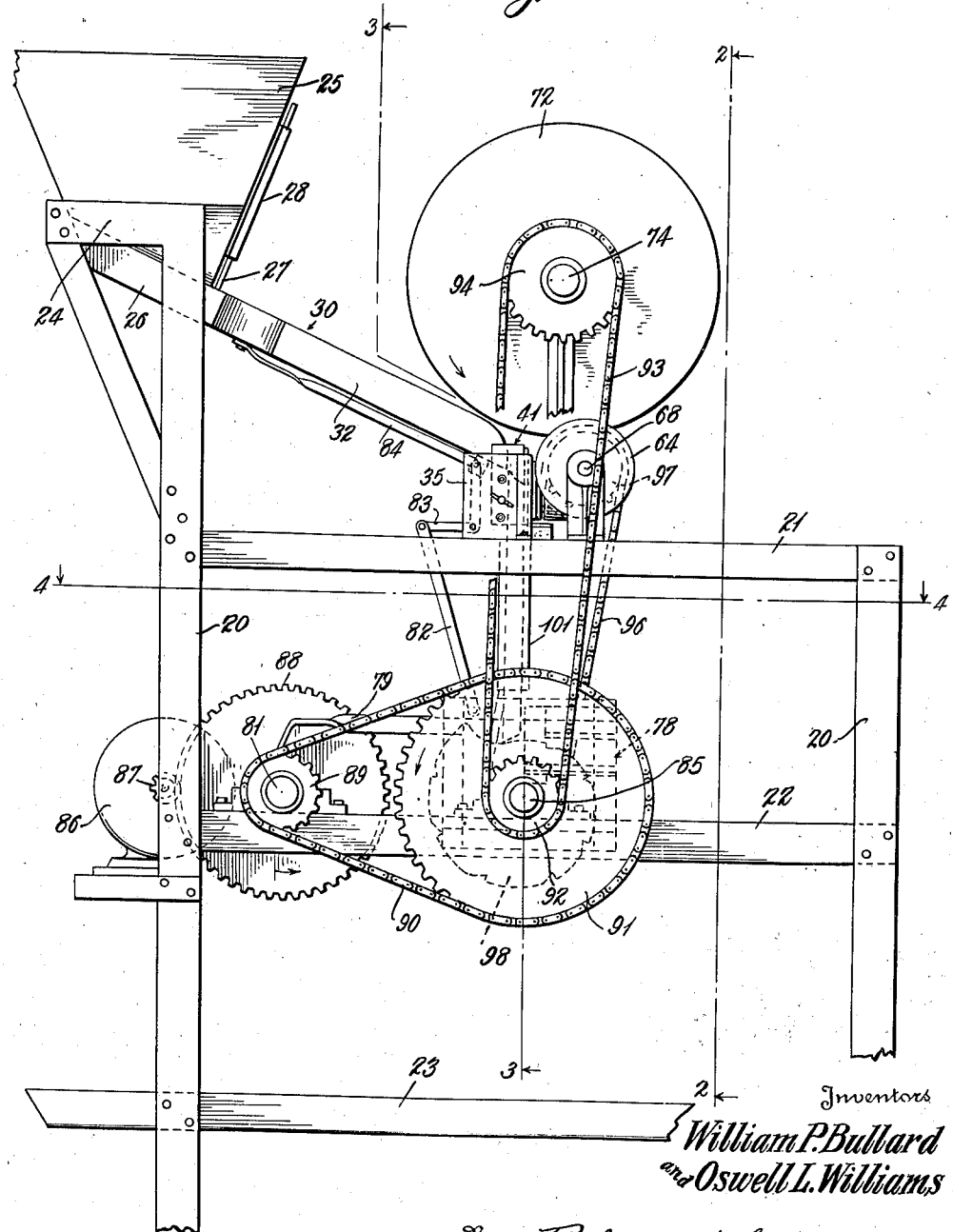
Figure 1 is a side elevation of the machine.

Referring to the drawings in detail and particularly to Figure 1, the improved machine comprises a main frame preferably constructed of angle iron, consisting of vertical supporting members 20 and transversely connecting horizontal members 21, 22, and 23. It is to be understood that Figure 1 shows only one side of the supporting frame and that these members 20, 21, 22, and 23 are duplicated to form the other side of said frame, both sides being connected together by proper cross members shown generally in Figures 2 and 3. At one end of the frame the vertical supporting members 20 are extended upwardly to provide a bracket 24 elevated above the top horizontal member 21.

This bracket 24 supports a hopper or the like 25 having a downwardly inclined bottom 26 (Figs. 5 and 6) the inner wall of said hopper adjacent the downwardly inclined bottom having a discharge opening provided with a vertically movable gate or the like 27. This gate 27 is antifrictionally-mounted in guide ways 28 carrying roller or ball bearings 29 (Figs. 18 and 19). The lower inner edge of the gate 27 is beveled for the purpose to be hereinafter more fully described.

Extending downwardly from the hopper 25 and in line with the inclined bottom 26 thereof, is an improved type of conveyor chute 30. With particular reference to Figs. 7 and 8, this chute 30 comprises a stationary side wall 31 and a reciprocating or sliding section, forming as an integral member the other side wall 32 and the bottom 33. The upper end of this chute extends into the hopper 25, the stationary side wall 31 being rigidly secured to one side of the hopper and the bottom 33 at this point is slidably supported on the bottom 26 of said hopper, it to be understood that during the operation of the machine the slidable section of the chute is continuously reciprocated in a manner and for the purpose to be later described.

Again referring to Fig. 7 it will be noted that the upper end of the chute 30 is widened out, as at 34, and it is this wider portion that extends into the hopper, and forms in reality the bottom of said hopper (see Fig. 8). The nuts or the like deposited into the hopper actually rest at all times on the upper end of the reciprocating chute, which feature is a very important one and will be taken up in more detail later.

The lower end of the conveyor or chute 30 extends downwardly to a point adjacent the upper side frame member 21. At this point the machine is provided with a substantially box-like housing (see Figs. 10-20) comprising side plates 35 and 36 and corner angle bars 37 said angle bars being formed with laterally extending flanges or feet 38 for securing the same to a supporting plate or cross member 39. This housing carries a supporting bracket 40 for the lower end of the chute, and the extreme end thereof extends into a throat or the like 41 shown in sectional detail in Fig. 12.

This throat is positioned within the box-like housing between the side plates 35 and 36 and comprises transversely adjustable side members 42 and 43 slidably supported upon rods or bolts 44 and 45 extending through the side plates 35 and 36 and secured thereto. Also extending through the adjustable members 42 and 43 and the side plates 35 and 36 is a right and left hand threaded adjusting screw 46 provided with a handle 47 whereby the side members 42 and 43 of the throat 41 may be adjusted within the desired limits as required.

Vertically slidable or reciprocating in the adjustable throat 41 is an elevating rod or bar 48 (see Figs. 9 and 20) the upper end of which being concave, and inclined downwardly as at 50, in a more or less continuation of the inclined chute 30 to receive the nuts or the like as they are discharged one by one from the end of said chute.

The purpose and function of this elevator bar 48 is another important feature of the present invention and its cooperation with the adjustable throat 41 will be more fully described later when taking up the operation of the machine.

Again referring more particularly to Figs. 10 and 20, the box-like housing above referred to, also supports the marking or printing device and one of the die or type-cleaning devices.

The marking or printing device comprises a rotary member 51 which may be either square or cylindrical, and disposed around the outer face thereof are secured preferably four marking or printing dies, 52, said printing device 51 being adapted to rotate about a shaft 53 secured to a plate 54 superimposed upon a plate 55, said plates being fastened to the angle bars 37 by rivets or the like 56.

Also supported by the plate 54 just below the shaft 53 is another shaft 57 for rotatably supporting the type-cleaning roller 58.

Interposed between the combined throat and elevator bar assembly and the inner faces of the angle bars 37 is a stop plate 59 extending above the said angle bars and the side plates 35 and 36. The lower end of the plate 59 is provided with a flange or foot 60 adapted to rest upon soft sponge rubber pads or the like 61 and the extreme upper edge of this plate 59 is curved or recessed as at 62 (Fig. 10), said stop plate and its peculiar construction and mounting being for the purpose to be hereinafter more fully described.

Mounted each side of the printing device 51 are two disks 63 and 64 respectively, disk 63 being the first type-cleaning disk, cylinder 58 a second type-cleaner and disk 64 a type-inking disk (see Figs. 9, 11 and 13). The inner face of the cleaning disk 63 has first applied thereto a layer of sponge rubber 65, on top of that a disk of blotting paper 66 with an outer facing of fine felt 67. This is the present preferred construction but it is obvious that any similar arrangement may be used. The facing on the cylindrical type-cleaner 58 is of the same construction and arrangement as that used on the disk 63. The inner face of the type-inking disk 64 has applied thereto a disk of sponge rubber or such material as will readily absorb and properly apply the necessary ink or coloring to the marking or printing dies 52 of the printing device 51. The disk 63 is continuously driven by a shaft 68 and on the inner end of this shaft is secured a segmented bevel gear 69 adapted to periodically mesh with a mutilated bevel gear 70 carried by the printing device 51 whereby said printing device will be intermittently rotated one quarter of a turn or 90 degrees, to successively bring into position one of its printing dies 52 as will be described more fully later. The bevel gear 70 is mutilated by filing down its teeth at intervals such that the smooth suface of bevel gear 69 will cooperate with the mutilated surface of bevel gear 70 to lock the two gears against movement during the period of dwell of these two gears. This mode of producing intermittent gearing, being well known in the mechanical arts, requires no discussion. Carried by the inking disk 64 is another bevel gear 71 positioned to also mesh with the mutilated gear 70 carried by the printing device 51, all of which is clearly shown in Fig. 13. From the foregoing it will be noted that a rotation of the shaft 68 will cause an intermittent rotation of the printing device 51 which in turn will intermittently rotate the inking disk 64 all in predetermined time relation so that during the various periods of rest of the printing device between rotations, each printing die will engage first the cleaning disk 63, next receive a second cleaning upon engagement with the cleaning cylinder 58 and finally have applied thereto the necessary ink or coloring matter ready for the next printing operation.

This preliminary cleaning before reinking is very important as will be explained later and is another important feature of the present invention. It will of course be understood that the arrangement of the teeth on the various gears will be such as to accomplish the desired result and should require no detailed description.

Mounted above the printing device, the lower end of the conveyor chute and the elevator bar and associated parts, is a positively rotated disk or cylinder 72 for feeding the nuts from the lower end of the chute 30 in predetermined order to the printing or marking device 51. The outer surface or periphery of said nut feeding disk or cylinder is concave in cross section and faced with sponge rubber or the like 73, so that there will be no damage to the nuts during this feeding operation. This feeding disk is carried by a shaft 74 mounted transversely of the machine frame, as clearly shown in Fig. 2.

In Fig. 16 a modified form of feeding means is shown wherein the facing on the feeding disk 72 has substituted therefor a sponge rubber or the like belt 75 and a pair of spaced pulleys 76 and 77. In this arrangement the outer face of the belt 75 is provided with a concave channel as clearly shown in cross section in Fig. 17.

Referring back to the conveyor chute 30 and with particular reference to Figs. 5, 6, and 9, the means for agitating or reciprocating said chute, comprises a rectangular or square frame 78 surrounding the shaft 85 and provided with a substantially rigid supporting arm 79 having a downwardly inclined portion 80 freely embracing a shaft 81 transversely mounted on the main frame of the machine. This shaft 81 merely provides a convenient means for positioning the frame 78 and its rotation during its real function has nothing to do with the operation of the frame 78. Extending upwardly from the inner corner of the frame 78 is a link 82 and the upper end of said link is pivoted to the lower arm of a bell-crank lever 83, which bell-crank is in turn pivotally mounted between the side plates 35 and 36 of the box-like housing previously referred to (Fig. 20). Pivotally connected to the upper arm of the bell-crank 83 is a second link 84 and the opposite end of this link is secured to the bottom 33 of the conveyor chute 30.

The operating mechanism (Fig. 1) for the various parts of the machine hereinbefore described is carried on the intermediate horizontal members 22 and comprises a main driven shaft 85, a counter shaft 81, and an electric motor or similar power plant 86. The motor shaft is provided with a small gear 87 meshing with a large gear 88 on the shaft 81 which shaft in turn is provided with a relatively small sprocket wheel 89 adapted to receive a sprocket chain 90 running to a relatively large sprocket wheel 91 secured to the shaft 85. Keyed to one end of main operating shaft 85 (Fig. 2) outside of the sprocket wheel 91 is a small sprocket wheel 92 provided with a sprocket chain 93 running to a somewhat larger sprocket wheel 94 secured to the shaft 74 for driving the feeding disk 72 hereinbefore referred to. Keyed to the opposite end of the main shaft 85 is another relatively small sprocket wheel 95 having a sprocket chain 96 running to a similar sprocket wheel 97 secured to the shaft 68, previously referred to in connection with the devices as illustrated in Fig. 13, and providing the necessary driving mechanism for the marking or printing device and its associated cleaning and inking disks. (See Fig. 2).

Also mounted on the main shaft 85, intermediate the ends thereof and driven thereby is a spiral cam disk 98. Referring particularly to Figs. 5 and 6, this cam disk 98 is provided with a number of spaced notches 99 and a curved stepped portion or drop 100.

Again referring to the elevator bar 48, this bar is positioned directly over and is adapted to be engaged by the cam disk 98 (Figs. 5 and 6) and the lower portion thereof is provided with a box-like guide 101 properly spaced around said elevator bar 48 to permit the mounting of ball or roller bearings 102 between these parts, thus allowing quick and positive action of this bar during the operation of the machine which is absolutely necessary. (See Fig. 9).

Again referring to the frame 78 (Figs. 5 and 6) for operating the linkage connecting said frame with the conveyor chute 30, this frame is mounted along-side the cam disk 98 and is provided with an angle iron 103, one flange of which 104, extends over the edge of the cam disk 98 in a position to be engaged thereby during the operation of the machine. This angle iron 103 is secured to a relatively square plate 105 fastened to the upper right-hand corner of the frame 78. The lower edge of the plate 105 is provided with an angle iron 106 having secured to the inner corner thereof a sponge rubber pad or the like 107 adapted to strike the shaft 85 and providing a cushioning means for the frame when the same is dropped to its lowermost position during the operation of the device.

In the operation of the machine the nuts or the like are deposited in bulk in the hopper 25 and by their own weight and resultant pressure, assisted by the inclination of the hopper bottom and the agitation of the hopper 30, are caused to move downwardly against the vertically movable gate 27.

As hereinbefore described the upper end 34 of the chute 30 extends into the hopper and provides a reciprocating bottom for said hopper.

The lower inner edge of the gate 27 being beveled and said gate being freely movable upwardly, the pressure of the nuts within the hopper against the gate, together with the reciprocation of chute 30 will move said gate upwardly sufficiently to permit the lowermost nuts to pass out in a single layer and thereby relieve any tendency to arch or jam at the hopper outlet. It will be seen, therefore, that this gate action, together with the up and down sliding motion of the conveyor chute 30 prevents the egress from the hopper of too many nuts at one time and said nuts will move down the chute in a single layer, which is the ideal manner of feed.

In the foregoing specification, a crank and link mechanism, together with a rocking frame and cooperating spiral rotary cam disk were described for producing the necessary sliding and agitating of the conveyor chute. Upon referring to Figs. 1, 5, and 6, it will be noted that as the cam rotates, the frame 78 will be gradually raised and in so doing will cause a downwardly sliding movement of the chute 30. During the operation the cam 98 rides under the flange 104 of the frame 78 and the notches 99 cause a jarring or agitating action of said chute, so that there is produced a combined sliding and agitating of the conveyor chute for the purpose as hereinbefore described. When the cam reaches the end of one complete revolution the flange 104 will ride over the step 100 and said frame 78 will drop to its original position. This sudden dropping of the frame 78 will quickly return the chute to its upermost position, which in combination with its slow downward movement and simultaneous agitation, provides a novel conveying mechanism when combined and cooperating with the particular form of self-adjusting gate, thus producing an ideal and efficient means of automatically discharging the nuts from a bulk supply in a positive and predetermined manner.

As the nuts reach the lower end of the conveyor chute 30 they are deposited in single relation into the adjustable throat 41 (Fig. 5), against the stop plate 59 and directly above the elevator bar 48. At this point the elevator bar 48 will begin to rise and engage the nut, as the lower end thereof rides on the rotating cam 98. As said cam continues to rotate the elevator bar will gradually lift and while so doing will be jarred or agitated by reason of its engagement with the notches 99 around the edge of said cam.

This jarring action of the elevator bar will be transmitted to the nut resting on the upper concave end thereof and will result in positioning the said nut to be fed in proper position to the marking or printing die.

As the elevator bar 48 continues to rise as the cam 98 rotates, the said nut will be forced into engagement with the cushioned periphery of the feeding disk or cylinder 72 (Figs. 6 and 9), the rotation of said feeding disk in a counter-clockwise direction rolling the nut over the upper edge of the stop plate 59 onto one of the marking or printing dies 52 of the printing mechanism, the soft rubber pads 61 under the lower edge of said stop plate permitting the said plate to descend sufficiently to prevent crushing or damaging of said nut.

The lower end of the elevator bar by this time will have reached the high point on the rotating cam 98 and thereafter drop down the stepped portion 100 ready to receive the next nut as clearly shown in Fig. 5.

This lifting and jarring of the elevator bar to properly position the nut in the adjustable throat and present the same with its longitudinal axis transversely of the plane of rotation of the feeding disk is another very important feature of the present invention.

As hereinbefore described, the marking or printing device 51 is provided preferably, with four spaced dies or the like 52 and is so timed in its step-by-step rotation that one of the said dies is always in position to receive a nut to be marked as the same is fed thereto by the feeding disk 72. After each marking, the printing device 51 is rotated one quarter of a turn (where four dies are used) and as the next succeeding die is marking the next nut, the previously used die is in engagement with the first cleaning disk 63 and during the next successive periods of rotation said die engages the second cleaning device or cylinder 58, then the inking disk 64 (Fig. 13) and from there rotated to again be in position for marking or printing.

This cleaning operation is another very important feature of applicants' invention, for in the event there is some delay in the delivery of a nut to the elevator bar and said bar in its cycle of operation is raised without lifting a nut to the feeding disk 72 for delivery to a marking die and that die be rotated and again inked without first being used, the next marking operation of said die would result in a blurring or smearing of the mark owing to the excess amount of ink on said die. It will therefore be seen that this cleaning of the die after each inking, especially where any one of the dies is not used for the reason as above stated, is vital to the efficient and successful operation of the machine as a whole.

Furthermore, a proper inking of the dies on the printing device is very important, and heretofore has given considerable trouble in machines of this type. Various complicated arrangements have been devised but without success. In the present machine this trouble has been overcome by the provision of a simple arrangement comprising the disk 64 provided with a facing of sponge rubber of relatively fine texture and in the practical use of this simple, cheap and efficient arrangement the proper amount of ink is applied and at the same time owing to the inherent characteristics of the sponge rubber the same will absorb and be capable of retaining for relatively long periods the necessary ink or the like for the inking operations.

In Figure 16 of the drawings there is illustrated a modified arrangement of feeding device wherein a sponge rubber belt 75 has been substituted for the sponge rubber facing 73 of the feeding disk 72. Similar to the concave construction of the facing on the disk 72, the outer facing of the rubber belt 75 as illustrated in Figure 17, is likewise concave in cross-section, the purpose of course in both instances is to permit the proper contact with the curved outer contour of the nuts or the like being fed by these devices during the operation of the machine.

In both the disk and the belt feeding devices, the outer periphery of the rotating member or disk 72 may be provided with a groove of concave or angular shape in cross-section, or said periphery may be flat, the important feature being the concave groove construction of the nut-engaging portion of the outer face of the belt or disk made of sponge rubber.

After rolling over the marking or printing die, the nuts are carried off the die by the feeding disk 72 to be collected in any desired manner.

Although certain specific devices and means have herein been illustrated and described to perform the functions set forth, it is of course to be understood that the improved features of the instant machine are capable of broad application within the novel scope of the invention.

What we claim is:

1. In a machine for marking nuts and the like, the combination with a supporting frame, of a supply hopper, a marking device, means for conveying said nuts from the hopper to the marking device and an automatically adjustable upright gate having a beveled lower edge antifrictionally mounted in the wall of said hopper for self-adjustment and designed to remain lowered solely under its own weight, said gate being adapted to be raised by the pressure of the nuts in the hopper acting against the beveled lower edge of the gate to permit only the individual discharge of said nuts.

2. In a machine for marking nuts and the like, the combination with a supporting frame, of a supply hopper, a marking device, means for conveying said nuts from the hopper to the marking device, said conveying means comprising a chute, a peripherally-notched cam having a generally spiral portion and a generally radial portion, a follower adapted to ride upon the surface of the cam, linkage operatively connecting said follower to the chute, said cam being designed for causing a gradual downward movement of said chute together with a slight agitation and a sudden full upward movement thereof, all of said movements being in proper sequence and in timed relation with respect to the cooperating elements of said machine.

3. In a machine for marking nuts and the like, the combination with a supporting frame, of a supply hopper, a marking device, a chute for conveying said nuts from the hopper to the marking device, said chute consisting of a stationary side portion and a combined bottom and side sliding portion cooperating with said stationary portion and means for reciprocating said sliding portion.

4. In a machine for marking nuts and the like, the combination with a supporting frame, of a supply hopper, a marking device, a chute for conveying said nuts from the hopper to the marking device, a spiral notched rotary cam, and means interposed between said cam and chute whereby said chute will be agitated upon the rotation of said cam.

5. In a machine for marking nuts and the like, the combination with a supporting frame, of a supply hopper, a marking device, a chute for conveying said nuts from the hopper to the marking device, a spiral notched rotary cam, and a link and lever mechanism interposed between said cam and chute whereby the chute will be agitated upon the rotation of said cam.

6. In a machine for marking nuts and the like, the combination with a supporting frame, of a supply hopper, a marking device, a chute for conveying said nuts from the hopper to the marking device, a spiral notched rotary cam, a bell crank lever pivotally mounted in the supporting frame adjacent the lower end of the chute, a link connecting said chute with the upper arm of said bell crank, a link connected to the lower arm of said bell crank and means carried by said last mentioned link for engagement with the cam whereby said chute will be agitated upon the rotation of said cam.

7. In a machine for marking nuts and the like, the combination with a supporting frame, of a supply hopper, a marking device, means for conveying said nuts from the hopper to the marking device and an adjustable throat into which the nuts individually are discharged from the conveying means to be properly positioned before delivery to said marking device, said throat comprising a pair of parallel blocks together presenting a channel for the reception of a nut and means for varying the spacing of the blocks to expand or to contract the channel.

8. In a machine for marking nuts and the like, the combination with a supporting frame, of a supply hopper, a marking device, means for conveying said nuts from the hopper to the marking device, an adjustable throat interposed between the discharge end of the conveying means and the marking device, and a vertically reciprocating elevating member cooperating with said throat in position to engage the underside of said nut in the throat and raise it into proper position to be presented to the marking device.

9. In a machine for marking nuts and the like, the combination with a supporting frame, of a supply hopper, a marking device, means for conveying said nuts from the hopper to the marking device, an adjustable throat interposed between the discharge end of the conveying means and the marking device, a feed roller mounted above these parts and a vertically reciprocating elevating member cooperating with said throat in position to engage the underside of said nut in the throat and jar it into proper position to be presented to the marking device and at the same time elevate it into engagement with the feed roller, whereby it is carried forward onto said marking device.

10. In a machine for marking nuts and the like the combination with a supporting frame, of a marking device, means for conveying said nuts to the marking device, a throat into which the nuts individually are discharged from the conveying means, a vertically reciprocating elevating member cooperating with said throat in position to engage the underside of said nut in the throat and jar it into proper position to be fed to the marking device, and means for reciprocating and elevating said member.

11. In a machine for marking nuts and the like the combination with a supporting frame, of a marking device, means for conveying said nuts to the marking device, a throat into which the nuts individually are discharged from the conveying means, a vertically reciprocating elevating member cooperating with said throat in position to engage the underside of said nut in the throat and jar it into proper position to be fed to the marking device, and a rotary spiral notched cam for reciprocating and elevating said member.

12. In a machine for marking nuts and the like the combination with a supporting frame, of a marking device, means for conveying said nuts to the marking device, a throat into which the nuts individually are discharged from the conveying means, a vertically reciprocating elevating member cooperating with said throat in position to engage the underside of said nut in the throat and jar it into proper position to be fed to the marking device, and a continuously rotating spiral notched cam adapted to be engaged by the lower end of the elevating member for reciprocating and elevating said member.

13. In a machine for marking nuts and the like, the combination with a supporting frame, of a marking device means for feeding nuts to said marking device, a series of dies on said marking device means for intermittently rotating the marking device to present a different die to each nut, a pair of cleaning devices for successively operating on each die and means for inking each die after said final cleaning operation.

14. In a machine for marking nuts and the like, the combination with a supporting frame, of a marking device means for feeding nuts to said marking device, a series of dies on said marking device means for intermittently rotating the marking device to present a different die to each nut, a pair of cleaning devices for successively operating on each die and means for inking each die after said final cleaning operation, said cleaning devices comprising rotary members provided with a facing consisting of an inner layer of sponge rubber, an intermediate layer of blotting material and an outer layer of fine felt.

15. In a machine for marking nuts and the like, the combination with a supporting frame, of means for supplying said nuts to the machine in bulk, a marking device, means for conveying said nuts from said supplying means to the marking device, a continuously rotating cushioned disk-like member positioned above and between the conveying means and the marking device and a vertically reciprocating means for gradually forcing the nuts individually into engagement with said rotating disk-like member, whereby said individual nuts are periodically fed into and across said marking device.

16. In a machine for marking nuts and the like, the combination with a supporting frame, of means for supplying said nuts to the machine in bulk, a marking device, means for conveying said nuts from said supplying means to the marking device and means for feeding the nuts individually from the conveying means to marking position relative to said marking device, said conveying means comprising a disk provided with a facing of sponge rubber, the contacting surface of said facing being concave in cross-section.

17. In a machine for marking nuts and the like, the combination with a supporting frame, of means for supplying said nuts to the machine in bulk, a marking device, means for conveying said nuts from the supplying means to the marking device and means for feeding the nuts individually from the conveying means to marking position relative to said marking device, said feeding means comprising a sponge rubber belt, the outer face of said belt being concave in cross-section.

18. In a machine for marking nuts and the like, the combination with a supporting frame, of means for supplying said nuts to the machine in bulk, a marking device, means for conveying said nuts from the supplying means to the marking device and means for inking said marking device, said inking means comprising a rotary disk provided with a facing of sponge rubber adapted to be periodically engaged by said marking device.

19. In a machine for marking nuts and the like, the combination of a cushioned member adapted to travel in an endless path, a marking die located adjacent and in spaced relation to the cushioned member, a conveyor for directing nuts from a source of supply to the marking die and a member for transferring the nuts from the conveyor to a position between the cushioned member and marking die so that the nuts are rolled over the marking die by the cushioned member.

20. In a machine for marking nuts and the like, the combination of a cushioned member adapted to travel in an endless path, a marking die located adjacent and in spaced relation to the cushioned member adapted to travel in an endless path, a conveyor for directing nuts from a source of supply to the marking die, and a reciprocating member for transferring the nuts from the conveyor to a position between the cushioned member and marking die so that the nuts are rolled over the marking die by the cushioned member.

WILLIAM P. BULLARD.
OSWELL L. WILLIAMS.